United States Patent [19]

Orain

[11] 4,431,236
[45] Feb. 14, 1984

[54] BALL BEARING AND APPLICATIONS THEREOF IN PARTICULAR IN A VEHICLE WHEEL HUB

[75] Inventor: Michel A. Orain, Conflans Sainte Honorine, France

[73] Assignee: Glaenzer Spicer, Poissy, France

[21] Appl. No.: 361,065

[22] Filed: Mar. 23, 1982

[30] Foreign Application Priority Data

Mar. 25, 1981 [FR] France .................. 81 05975

[51] Int. Cl.³ ................ F16C 19/18; F16C 33/58
[52] U.S. Cl. ......................... 308/190; 308/174; 308/193; 308/233; 308/235
[58] Field of Search ........... 308/183, 188, 190, 189 A, 308/191, 233, 235, 241, 174, 197, 193, 194

[56] References Cited

U.S. PATENT DOCUMENTS

| | | | |
|---|---|---|---|
| 774,893 | 11/1904 | Riebe | 308/235 |
| 1,591,395 | 7/1926 | McNeely | |
| 2,553,536 | 5/1951 | Frenkel | 308/174 |
| 2,848,286 | 8/1958 | Williams | 308/193 |
| 4,035,043 | 7/1977 | Markley | 308/188 X |

FOREIGN PATENT DOCUMENTS

| | | |
|---|---|---|
| 126936 | 4/1901 | Fed. Rep. of Germany . |
| 1067265 | 10/1959 | Fed. Rep. of Germany . |
| 903753 | 10/1945 | France . |
| 2062784 | 6/1971 | France . |
| 2408753 | 6/1979 | France . |
| 2453046 | 10/1980 | France . |
| 280284 | 12/1930 | Italy ................... 308/233 |

*Primary Examiner*—Stuart S. Levy
*Assistant Examiner*—Thomas R. Hannon
*Attorney, Agent, or Firm*—Wenderoth, Lind & Ponack

[57] ABSTRACT

This bearing is intended to be employed under a radial load of roughly constant direction, while it is capable of resisting axial forces and tilting moments. It comprises two rows of balls which circulate in raceways formed in a rotating center ring and fixed lateral rings. According to the invention, the distance between the bottom of grooves, formed in the lateral rings and constituting the raceways, and a reference plane, is variable and reaches a maximum value at two diametrically opposed points which are located in a diametrical plane perpendicular to the direction of the load.

12 Claims, 7 Drawing Figures

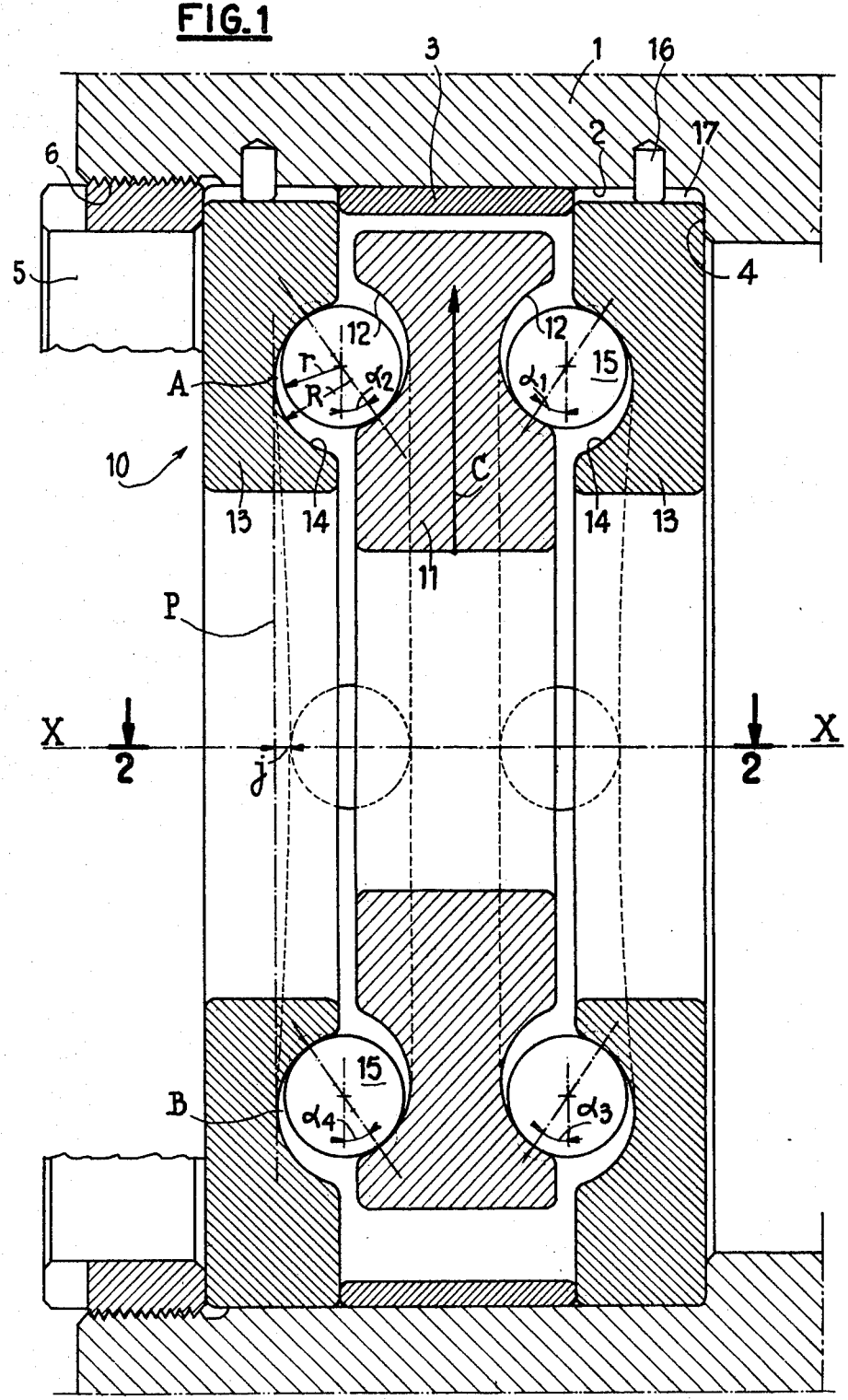

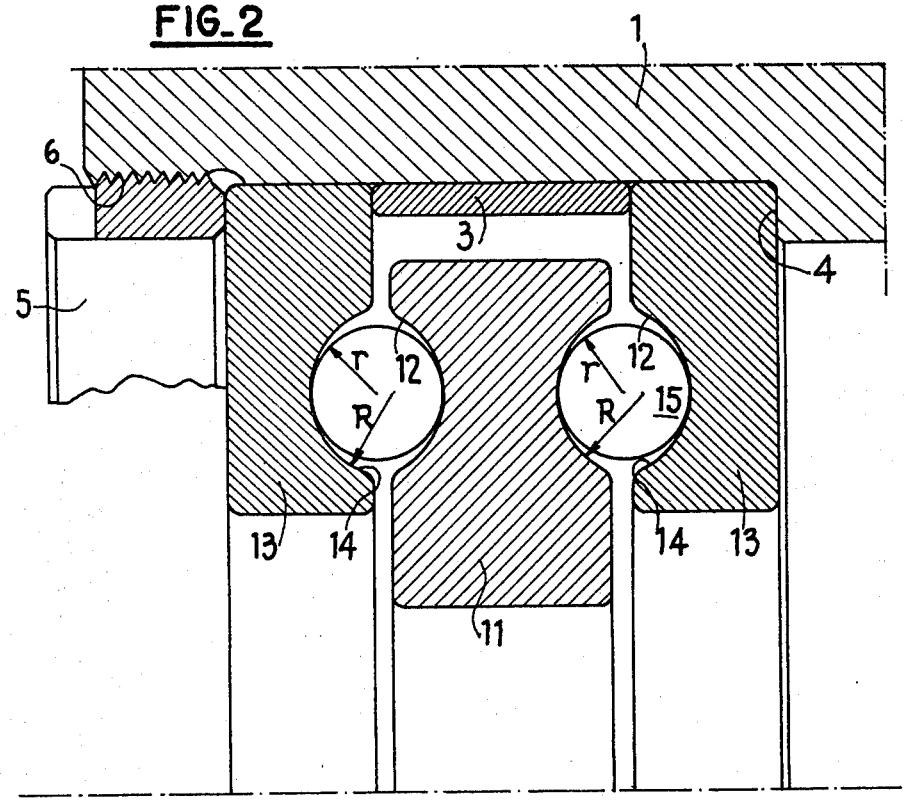
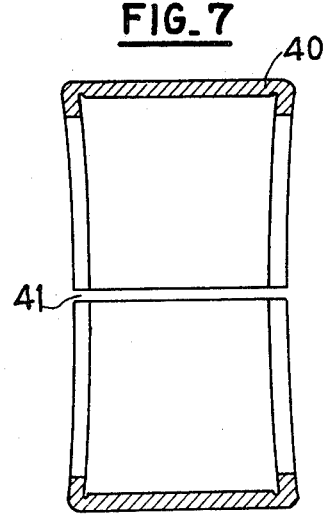
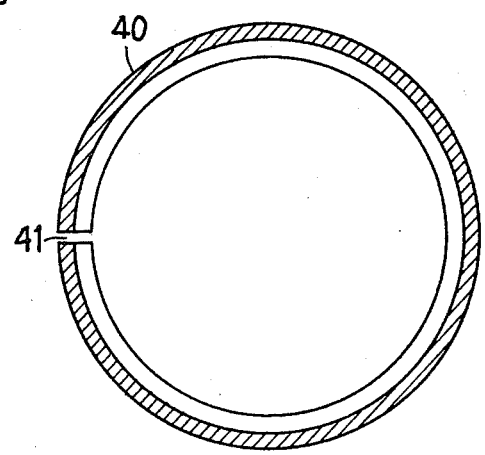

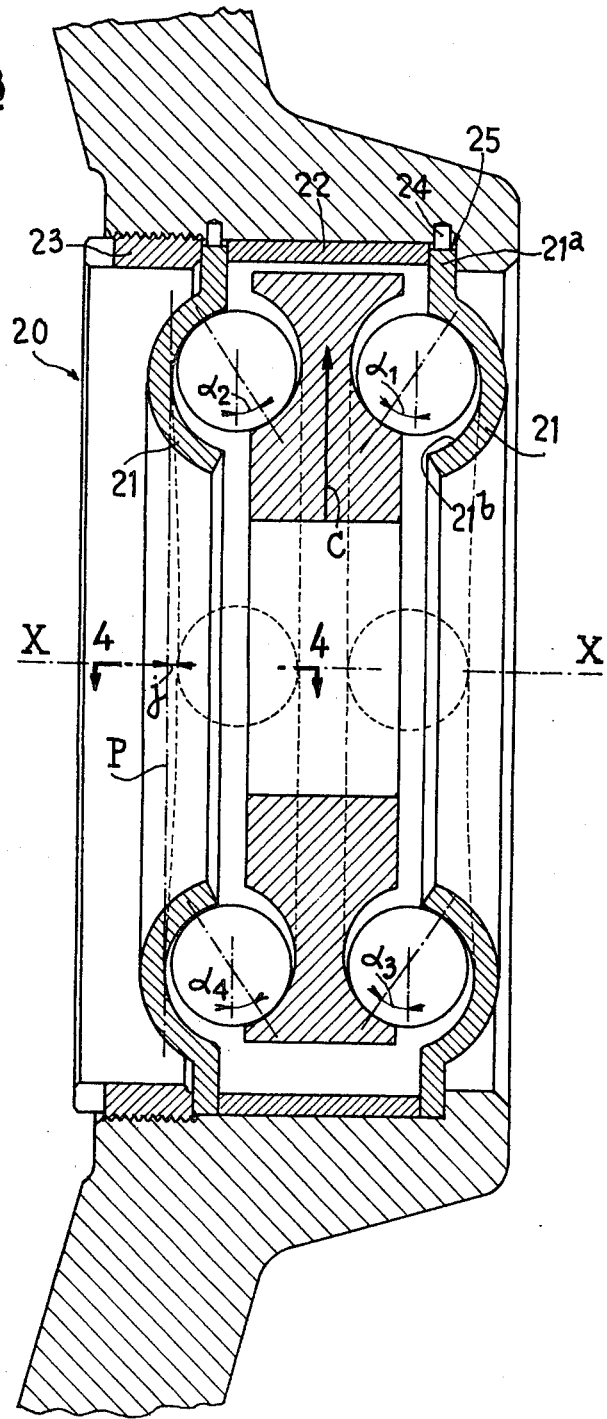
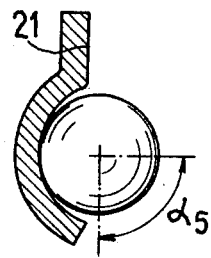
FIG.3
FIG.4

BALL BEARING AND APPLICATIONS THEREOF IN PARTICULAR IN A VEHICLE WHEEL HUB

The present invention relates to ball bearings and in particular to bearings of the type having two rows of balls such as disclosed in the U.S. Pat. No. 4,269,460 filed by the same applicant.

This prior patent discloses a rolling bearing which is capable of supporting stresses in variable directions and may be employed to particular advantage in a vehicle wheel hub. Such a bearing comprises at least two rows of balls which circulate between pairs of raceways, the raceways associated with each row of balls comprising two bearing surfaces which are roughly symmetrical to each other with respect to a plane perpendicular to the rolling axis and which have a cross section which is circular and has a radius which is slightly greater than that of the balls. Preferably, the arc of a circle constituting said section subtends an angle at the center which exceeds 120°. The principle of operation and the advantages of such a rolling bearing are described in the aforementioned patent application and need not be repeated here.

The object of the present invention is to still further improve such a bearing of the prior art, so as to achieve optimum conditions of operation as concerns a radial load of a roughly fixed direction, while preserving sufficient strength of the various elements and an operation without play under all circumstances.

This result is achieved in a rolling bearing such as that defined hereinbefore, wherein the distance between the bottom of at least one of the grooves constituting a raceway and a reference plane perpendicular to the rolling axis is variable, said distance varying between two minimum values at two diametrically opposed points located in or in the vicinity of a diametral plane parallel to the direction of a radial load and two maximum values at two points located in or in the vicinity of a diametrical plane perpendicular to the direction of said load.

Further:

the or each groove having this feature is formed in a fixed ring of the rolling bearing;

preferably, the variation in said distance or maximum deviation of the bottom of the or each groove with respect to the reference plane is between about 0.4 and 2% of the diameter of the balls;

the or each ring having a groove whose contour is thus modulated comprises means for positioning it angularly with respect to its support.

Examples of embodiments and applications of the invention will be given hereinafter with reference to the accompanying drawings which are given solely by way of example and in which:

FIG. 1 is a sectional view of a first embodiment of a rolling bearing according to the invention;

FIG. 2 is a partial sectional view taken on line 2—2 of FIG. 1;

FIG. 3 is view similar to FIG. 1 of a modification;

FIG. 4 is a partial sectional view taken on line 4—4 of FIG. 3;

FIGS. 6 and 7 are two sectional views in two orthogonal directions of an element which may be employed in a rolling bearing similar to that shown in FIG. 5.

FIG. 1 shows an angular contact radial rolling bearing 10 according to the invention having an axis X—X. This bearing is interposed between two coaxial elements which may be formed respectively by a wheel hub (not shown) in respect of the inner element and a wheel pivot 1 in respect of the outer element.

Figure 5:
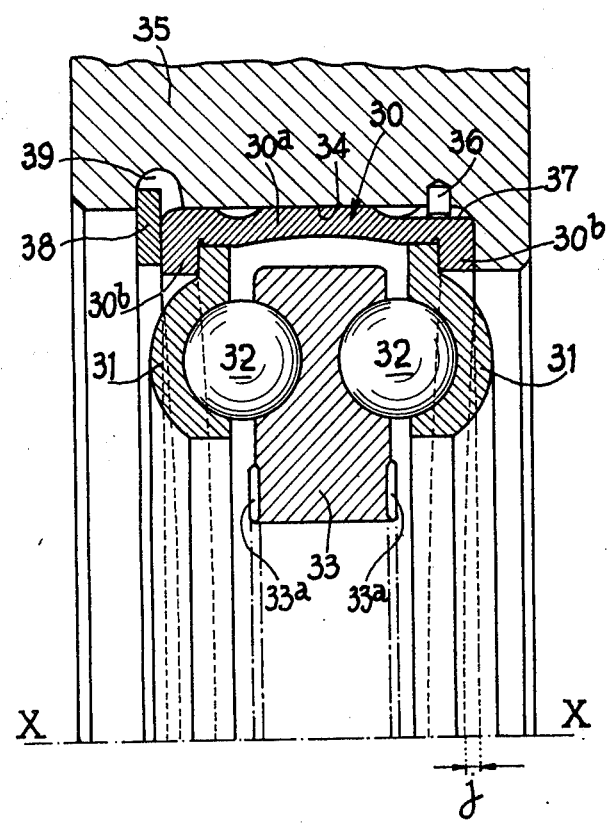
FIG. 5 is a partial sectional view of another modification.

The rolling bearing proper comprises a center ring 11 which defines on each radial side a raceway 12, and two fixed lateral rings 13 which define on their radial sides facing the center ring raceways 14. Each raceway is formed by a groove of circular or substantially circular cross-sectional shape. The radius R of these raceways is slightly greater than the radius r of the balls 15, the ratio between these two radii corresponding to the ratios of conformity usually employed in the ball bearing art. Thus, by way of example, the ratio R betweem the radius of a groove and the radius of a ball may be between 1.05 and 1.03. In the drawings, the various radii and the offset of the center ring relative to the fixed rings have been exaggerated for reasons of clarity and for a better understanding of the operation of the bearing.

The angle subtended at the center of each raceway in an elementary or cross-section is preferably greater than 120° so as to provide a sufficient angle of envelopment of the balls.

The fixed lateral rings 13 are received in a bore 2 of the wheel pivot and are separated by a spacer member 3 and clamped between a shoulder 4 on the wheel pivot and a screwthreaded ring 5 which is screwthreadedly engaged in a portion 6 of the wheel pivot which forms a nut. These lateral rings have a certain capacity to deform elastically in the axial direction and they have a well-determined angular position with respect to the wheel pivot determined in the illustrated embodiment by pins 16 received in cavities 17. The rotating center ring comprises ground raceways of revolution.

According to the invention, and as shown in the drawings, the bottom of the raceways 14 formed in the two fixed lateral rings 13 is not tangent at every point to the same plane perpendicular to the axis X—X. On the contrary, the distance between the bottom of a groove and a reference plane P perpendicular to this axis as shown in the drawing, progressively increases from a zero minimum value at two diametrically opposed points A, B located in or in the vicinity of a first diametral plane parallel to the direction of application of a pure radial load C whose direction is roughly constant, and a maximum value j at two diametrically opposed points located in or in the vicinity of a second diametrical plane perpendicular to the direction of the load C.

The value of j may be of the order of 0.05 to 0.2 mm in respect of balls of 12.7 mm in diameter and is usually between 0.4 and 2% of the diameter of a ball. A theoretical value of the distance or deviation j may be calculated in the following manner:

$$j = R - (R - r)\sin\alpha - r$$

$$j = (R - r)(1 - \sin\alpha), \text{ or}$$

$$\frac{j}{r} = \left(\frac{R}{r} - 1\right)(1 - \sin\alpha)$$

By way of example, if the diameter of the balls is equal to 12.7 mm, $R/r = 1.05$, $r = 6.35$ mm, $R = 6.6675$. If $\alpha=30°$, there is obtained a theoretical value of the deviation $j=0.15875$ mm.

It will be understood that the cavities 17 constitute reference means which enable the user to ascertain the orientation relative to the center of the bearing of said first diametral plane containing said minimum values of j when mounting the bearing in the part receiving the bearing.

However, this theoretical value may be modified in accordance with the desired rate and distribution of the pre-stressing. Indeed, the forces exerted on the balls which are located in said second diametral plane perpendicular to said first diametral plane, ie the direction of the fixed load may be zero if there is desired a slight clearance or an assembly without clearance or pre-stressing, or may have a certain low value depending on the desired pre-stressing. This pre-stressing is therefore directly related to the value of the maximum deviation j.

In this first embodiment, in which the rings are massive and machined, the modulation of the depth of the grooves of the lateral rings is provided at the moment of the grinding operation.

A rolling bearing such as that just described permits, in the case of a pure radial load of substantially fixed direction, represented by the vector C in FIG. 1, obtaining pressure angles, $\alpha_1$, $\alpha_2$, $\alpha_3$, $\alpha_4$, of the order of 25° to 45°, which corresponds to optimum conditions of operation of the rolling bearing, while preserving sufficient strength of the component elements and an operation without play under all circumstances in the region of the balls which are not loaded or which support a smaller load relative to the balls located in, and in the vicinity of, a plane parallel to the direction of the radial load.

In the embodiment shown in FIGS. 3 and 4, the rolling bearing 20 has the same general structure as that shown in FIGS. 1 and 2. However, the fixed lateral rings 21 are made from press-formed sheet metal and define a flange 21a and a raceway 21b. They are separated by a spacer member 22 and maintained axially inside the bore of the pivot or other support by the action of a screwthreaded ring 23. As in the foregoing embodiment, these rings are angularly positioned relative to the pivot by the action of pins 24 received in corresponding cavities 25 which latter, as explained before, constitute reference means for ascertaining the orientation of the diametral plane intended to be parallel to the fixed radial load when mounting the bearing in the part receiving it. As before, the distance between the bottom of the grooves of the fixed rings and a reference plane P perpendicular to the axis X—X of the rolling bearing varies progressively, the relative deviation j/r being of the order of 0.8% to 4%.

In this way, as in the first embodiment, when a radial load C is applied, the balls remain in continuous contact with the raceways throughout the periphery of the latter notwithstanding the fact that in the regions supporting the radial load the angles of contact $\alpha_1$, $\alpha_2$, $\alpha_3$ and $\alpha_4$, are between 25° and 45°. In the section in a plane perpendicular to the direction of the load C (FIG. 4), the angle of contact $\alpha_5$ is in the neighbourhood of 90°. Here again, the force in the region of the balls located in this region, may be zero or have a relatively low value so as to exert a pre-stressing.

Note that the greater the axial flexibility of the lateral rings, the easier is the regulation of the pre-stressing and the lower value of the deviation j can be. However, as the rings must preserve a certain strength, in particular for resisting high stresses of tilting moments due to the forces and lateral blows exerted on the wheels, their flexibility is in practice quite insufficient to produce the result obtained by the particular shape given to the grooves constituting the raceways.

With press-formed lateral rings, the variation of the distance defined hereinbefore may be obtained by different means:

the raceway 21b may be produced by a high precision press operation or by grinding, and may be of revolution about the axis of the ring when the latter is in the free state; on the other hand, the flange 21a has a lateral warp with two diametrically opposed offsets so that upon the axial clamping between the spacer member 22 and the ring 23, the flange is elastically deformed until it becomes planar and the bottom of the raceway then assumes the shape shown in the drawing;

upon grinding, the ring 21 may be clamped on the workholder table of the grinding machine in such manner that it has a warp or a deformation which is the opposite of that desired. After grinding, the flange returns elastically to a planar shape and the raceway then has the desired shape.

Another embodiment is shown in FIG. 5. In this case, a housing 30 assembles the various elements constituting the rolling bearing, namely two fixed rings 31, balls 32 and a rotating ring 33. This housing comprises a cylindrical body 30a and two flanges 30b which extend radially toward the axis of the bearing. It is a force fit in the bore 34 of the wheel pivot 35 with respect to which pivot it is angularly positioned by means of a pin 36 and a cavity 37. An elastically yieldable ring 38 fitted in a groove 39 constitutes a safety measure in that it prevents any possibility of the bearing coming away from the bore. However, the fitting of the housing in the bore must be rather tight in order to ensure that no sliding of this housing is possible under the effect of the currently encountered tilting moments.

Here again, the variation in the distance between the bottoms of the raceways of the fixed rings and a reference plane P may be obtained in various ways, for example:

by the use of fixed rings whose depth is variable as shown in FIG. 3;

by the use of fixed rings of constant depth but with a housing in which the distance between the flanges 30b is less in a horizontal plane than in a vertical plane, assuming that the fixed radial force is vertical as viewed in the drawing; the desired reduction in the distance between the flanges 20b may be obtained by deforming the housing under an axial force with a controlled displacement, for example in a set-up on a press.

In the embodiment shown in FIG. 5, there is provided a rotating ring 33 having front teeth 33a which are capable of transmitting the driving torque and capable of centering with precision the mechanical parts which are axially prevented from moving on each side of this ring.

The rings and the balls may be inserted inside the housing 30 in several ways and, merely by way of example, in accordance with the two following methods:

The housing is produced on a lathe or an automatic machine with a diameter which exceeds by about 7% the final diameter, from treated steel so as to have a strength of the order of 80 to 120 kg/mm², but preserving a sufficient elongation at rupture. The rings and the balls may thus be placed in position inside this housing which is thereafter shrunk diametrically by passing the housing in a die which produces the diametral shrinking onto the rings and a precise outside dimension.

A last operation consists in an axial compression on a press and permits bringing the flanges closer to each other in a modulated manner and to a low value and effecting the desired axial pre-stressing of the bearing.

Another method illustrated in FIG. 6 comprises using a split housing 40 which may be opened elastically to permit the insertion of the rings. The diametral pre-stressing in the bore of the wheel pivot or other element, when mounting the bearing, is then transmitted directly to the two fixed rings since the housing, in this arrangement, is diametrically elastically yieldable. The slot 41 in the housing may also be employed advantageously for angularly positioning or indexing the bearing with respect to the wheel pivot or other support.

Having now described my invention what I claim as new and desire to secure by Letters Patent is:

1. In an angular-contact radial ball bearing capable of taking loads in variable directions comprising an axis of rotation, two lateral rings, a center ring between the lateral rings, each ring having grooves defining raceways, at least two rows of spherical balls which are disposed to circulate between pairs of said raceways defined in confronting radial sides of the center ring and the two lateral rings, said grooves having a circular cross-sectional shape having a radius which is slightly greater than a radius of the balls; the improvement wherein at least one of the grooves constituting a raceway has a progressively variable contour in that said one groove has a bottom which is spaced at a distance from a reference plane perpendicular to the axis of rotation of the bearing, which distance progressively increases from two minimum values at two diametrally opposed points located substantially in a first diametral plane which contains said axis of rotation and is intended to be parallel to the direction of a radial load on the bearing, to two maximum values at two points located substantially in a second diametral plane which contains said axis of rotation and is perpendicular to said first diametral plane.

2. A bearing according to claim 1, wherein said one groove which has a variable contour is formed in a fixed ring of said rings.

3. A bearing according to claim 1, wherein the variation in said distance between the bottom of said one groove and the respective reference plane is between about 0.4 and 2% of the diameter of the balls.

4. A bearing according to any one of the claims 1 to 3, wherein the variation in the distance between the bottom of said one groove and the reference plane is so chosen as to create a given pre-stressing force which is exerted in a direction parallel to said rolling axis, in particular in the region of the balls located in the vicinity of a plane passing through said axis and perpendicular to the direction of said load.

5. A bearing according to any one of the claims 1 to 3, wherein the ring comprising the groove whose contour is variable comprises means for positioning the ring angularly with respect to a support therefor.

6. A bearing according to any one of the claims 1 to 3, wherein the variable contour of said one groove is the result of a grinding operation.

7. A bearing according to any one of the claims 1 to 3, wherein, in a free space between the lateral rings and the center ring, the ring having said groove of variable contour has a warp and a variable contour of said one groove is the result of an elastic deformation of the ring having said groove of variable contour when mounting the bearing.

8. A bearing according to any one of the claims 1 to 3, comprising a housing having a substantially cylindrical body and two flanges which extend radially toward said axis of the bearing, said housing assembling the two lateral rings, the center ring, and two rows of balls.

9. A bearing according to claim 8, wherein the housing is split so as to enable it to be opened by an elastic deformation thereof.

10. A bearing according to claim 9, wherein the split also constitutes means for correctly angularly positioning the bearing with respect to a support therefor.

11. A bearing according to claim 1, further comprising reference means in a fixed predetermined position on the ring having said raceway of progressively varying contour whereby a user of the bearing is able to ascertain visually the orientation of said first diametral plane so as to mount the bering in its correct position in a part receiving the bearing.

12. An automobile vehicle wheel hub comprising, mounted in an element of the hub, a ball bearing comprising two lateral rings, a center ring between the lateral rings, each ring having grooves defining raceways, at least two rows of balls which are disposed to circulate between pairs of said raceways defined in confronting radial sides of the center ring and the two lateral rings, said grooves having a circular cross-sectional shape having a radius which is slightly greater than the radius of the balls, at least one of the grooves constituting a raceway having a variable contour so that the distance between the bottom of said one groove and a reference plane perpendicular to the axis of rotation of the bearing is variable, said distance varying between two minimum values at two diametrally opposed points located at least in the vicinity of a diametral plane parallel to the direction of a radial load on the bearing, and two maximum values at two points located at least in the vicinity of a diametral plane perpendicular to the direction of said load.

* * * * *